United States Patent [19]

Phillips et al.

[11] 3,954,284

[45] May 4, 1976

[54] BICYCLE WHEEL SUSPENSION MEANS

[76] Inventors: Ronald F. Phillips, 4029 54th St., Des Moines, Iowa 50310; Philip Carl Johnson, 318 NE. 5th St., Ankeny, Iowa 50021

[22] Filed: Feb. 28, 1975

[21] Appl. No.: 554,119

[52] U.S. Cl. .................................. 280/277
[51] Int. Cl.² .................................. B62K 25/16
[58] Field of Search ........... 280/275, 276, 277, 279, 280/286, 274, 285

[56] References Cited

UNITED STATES PATENTS

| | | | |
|---|---|---|---|
| 848,324 | 3/1907 | Sager | 280/277 |
| 927,989 | 7/1909 | Meiser | 280/277 |
| 989,638 | 4/1911 | Pilgrim | 280/277 |
| 1,166,156 | 12/1915 | Shimmin | 280/277 |
| 1,527,133 | 2/1925 | Harley | 280/277 |
| 2,178,939 | 11/1939 | Pease | 280/283 |

FOREIGN PATENTS OR APPLICATIONS

| | | | |
|---|---|---|---|
| 636,211 | 4/1928 | France | 289/277 |
| 720,093 | 12/1954 | United Kingdom | 280/277 |

*Primary Examiner*—Robert R. Song
*Assistant Examiner*—Jack D. Rubenstein
*Attorney, Agent, or Firm*—Zarley, McKee, Thomte, Voorhees & Sease

[57] ABSTRACT

A suspension system for a bicycle having a frame with rearward and forward ends and a fork means rotatably mounted on the forward end thereof and having a pair of downwardly extending fork arms. A pair of arms are pivotally secured to the lower ends of the fork arms and extend forwardly therefrom. A wheel is rotatably secured to and is positioned between the pair of arms. A pair of spring support rods are pivotally secured at their lower ends to the pair of arms and extend upwardly and rearwardly therefrom. A bracket is secured to the fork and extends forwardly therefrom and has the spring support rods movably extending therethrough. An upper pair of springs are mounted on the upper ends of the spring support rods above the bracket and are maintained thereon by acorn nuts or the like. A lower pair of springs are mounted on the spring support rods below the bracket and are maintained in position by an adjustable clamp means secured to and extending between the spring support rods. The clamp means may be adjusted so that the springs on the rods are equally tensioned. The springs are normally in compression.

3 Claims, 4 Drawing Figures

BICYCLE WHEEL SUSPENSION MEANS

BACKGROUND OF THE INVENTION

This invention relates to a suspension system for a bicycle and more particularly to a suspension system for a front wheel of a bicycle. Various types of springs have been provided on the front wheels of bicycles or the like in an effort to provide a shock absorber for the front wheel. However, the conventional shock absorbers employed on bicycles do not satisfactorily absorb the shocks and sometimes tend to cause the front wheel to wobble.

Therefore, it is a principal object of the invention to provide an improved suspension system for a bicycle or the like.

A further object of the invention is to provide a suspension system for a bicycle which acts as a shock absorber.

A further object of the invention is to provide a suspension system for a bicycle including upper and lower pairs of springs which are normally maintained in compression.

A further object of the invention is to provide a suspension system for a bicycle including means for adjusting the tension in the springs employed therewith.

A further object of the invention is to provide a suspension system for a bicycle which may be mounted on the bicycle without extensively modifying the same.

A further object of the invention is to provide a suspension system for a bicycle which improves traction when cornering and braking at high speed, allowing safer performance bicycling.

A further object of the invention is to provide a suspension system for a bicycle which is economical of manufacture, durable in use and refined in appearance.

These and other objects will be apparent to those skilled in the art.

DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
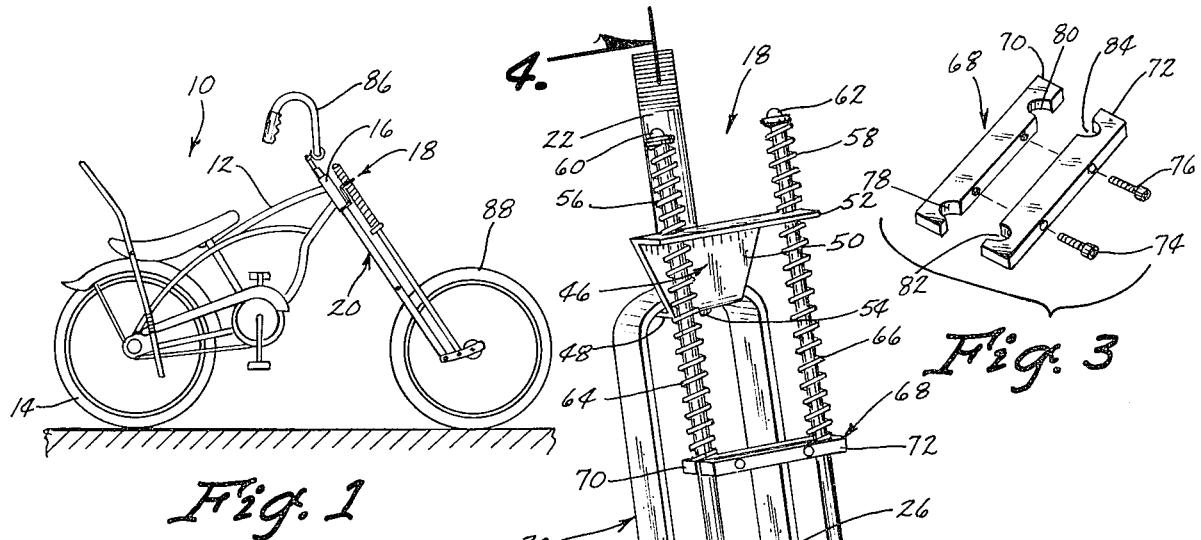
FIG. 1 is a side view of a bicycle having the suspension system of this invention mounted thereon.
Figure 3:
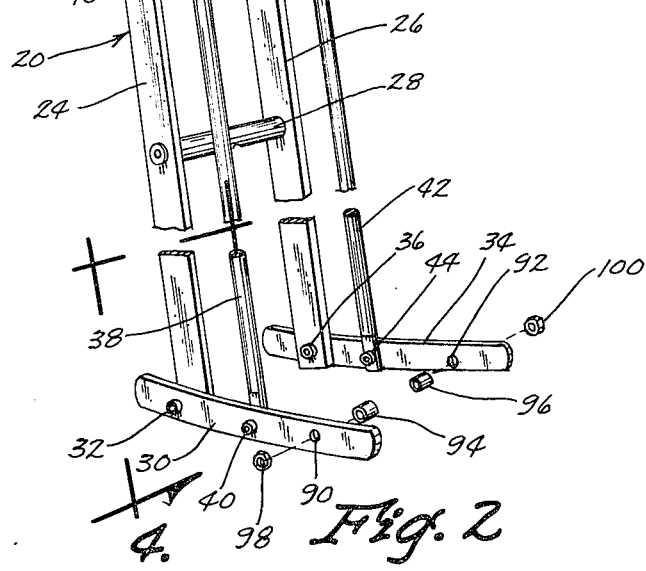
FIG. 3 is an exploded perspective view of the means for adjusting the tension in the springs.

In FIG. 1, the numeral 10 refers generally to a bicycle comprising a frame means 12 having a rear wheel 14 conventionally mounted at the rearward end of the frame. Frame 12 includes a collar member 16 which is adapted to rotatably receive the tubular portion of the front fork.

Figure 2:
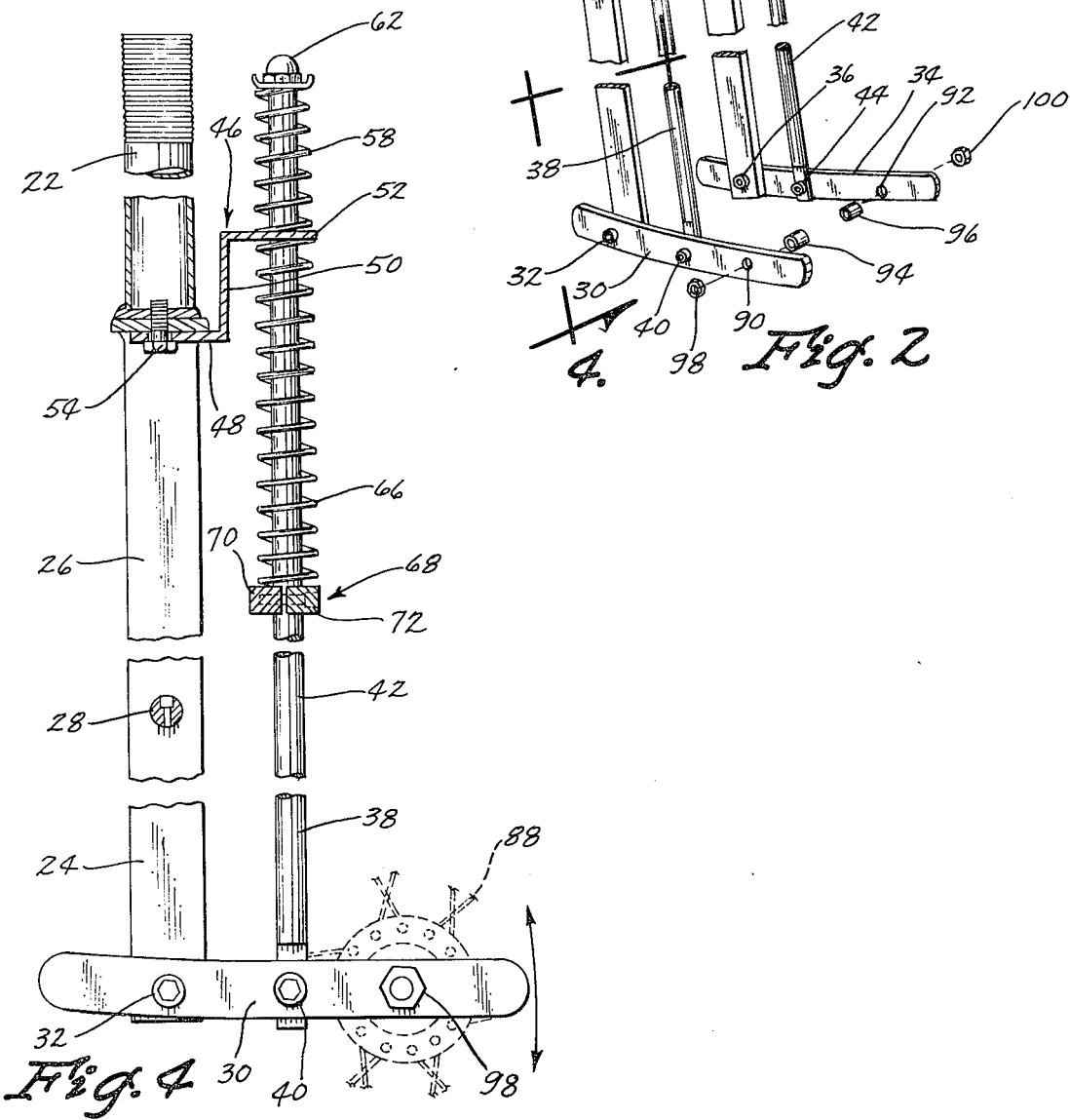
FIG. 2 is a partial perspective view of the suspension system.

The suspension system of this invention is referred to by the reference numeral 18 and generally comprises a fork means 20 including a tubular portion 22 having downwardly extending fork arms 24 and 26. Brace 28 is secured to and extends between the fork arms 24 and 26 as illustrated in FIG. 2. Arm 30 is pivotally secured to the lower end of fork arm 26 by bolt assembly 32 and extends forwardly and upwardly therefrom. Likewise, arm 34 is pivotally connected to the lower end of fork arm 26 by bolt assembly 36 and extends forwardly and upwardly therefrom.

Spring support rod 38 is pivotally connected at its lower end to arm 30 intermediate the length thereof by bolt assembly 40 and extends upwardly and rearwardly therefrom. Similarly, spring support rod 42 is pivotally connected at its lower end to arm 34 intermediate the length thereof by bolt assembly 44 and extends upwardly and rearwardly therefrom.

Figure 4:
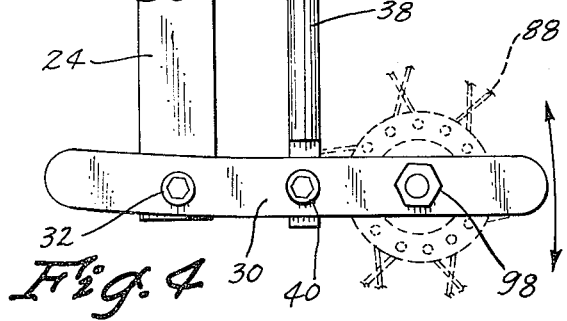
FIG. 4 is a sectional view seen on lines 4 — 4 of FIG. 2.

The numeral 46 refers to a bracket generally comprising lower portion 48, intermediate portion 50 and upper portion 52. Lower portion 48 of bracket 46 is secured to the fork 20 at the upper ends of fork arms 24 and 26 by means of bolt 54 in the manner illustrated in FIG. 4. Upper portion 52 of bracket 46 is provided with a pair of spaced apart openings which movably receive the spring support rods 38 and 42 extending therethrough. An upper pair of springs 56 and 58 are mounted on the rods 38 and 42 above upper portion 52 of bracket 46 and are maintained thereon by acorn nut assemblies 60 and 62 respectively. A lower pair of springs 64 and 66 are mounted on the rods 38 and 42 below the top portion 52 of bracket 46 and are maintained in position by a clamp means referred to generally by the reference numeral 68. Clamp means 68 comprises clamp members 70 and 72 which are detachably secured together by means of bolts 74 and 76 as illustrated in the drawings. Clamp member 70 is positioned with a pair of semi-circular openings 78 and 80 while clamp member 72 is provided with semi-circular openings 82 and 84 formed therein. Thus, clamp 68 is installed on the rods 38 and 42 so that rod 38 is received between the openings 78 and 82 and so that rod 42 is received between the openings 80 and 84. The tightening of the bolts 74 and 76 causes the clamp members 70 and 72 to frictionally engage the rods 38 and 42 to prevent movement of the clamp relative to the rods.

The suspension system 18 is mounted on the bicycle frame 12 by extending the tubular portion 22 upwardly through the collar member 16 on the frame. A handlebar assembly 86 is conventionally threadably mounted on the upper end of the tubular portion 22. Wheel 88 is rotatably secured to the arms 30 and 34 by causing the opposite ends of the axle thereof to extend outward through the openings 90 and 92 formed in the arms 30 and 34 adjacent the forward ends thereof. Ordinarily, the spacing of the arms 30 and 34 is such that spacers 94 and 96 would normally be positioned on the opposite ends of the axle between the wheel and the arms 30 and 34. The numerals 98 and 100 refer to nuts which are threadably secured to the outer ends of the axle.

The clamp 68 is preferably adjusted relative to the rods 38 and 42 so that the springs 56 and 58 and 64 and 66 are equally tensioned. If this tension is not equal, some resiliency in the spring rods will cause the wheel to "wobble". The springs 56, 58, 64 and 66 are normally in compression. When the wheel 88 engages an obstruction, the wheel forces the spring rods 38 and 42 upwardly to compress the springs 64 and 66 even more than they are normally compressed and causes the upper springs 56 and 58 to expand. When the upward pressure on the wheel is released, the lower springs 64 and 66 expand slightly to pull the upper springs into their normal state of compression.

The suspension disclosed herein is extremely strong and is very stable and safe to use. The opposing nature of the pairs of springs insures that the wheel will quickly be positioned in its normal position upon engaging obstructions and moving therefrom. Thus it can be seen that the suspension system of this invention accomplishes at least all of its stated objectives.

We claim:

1. A suspension system for a bicycle having a frame with rearward and forward ends,
    a fork means rotatably mounted on the forward end of said frame and having spaced apart first and second downwardly extending fork arms,
    first and second arms pivotally secured to said first and second fork arms respectively and extending forwardly therefrom,
    a wheel rotatably secured to said first and second arms at the forward ends thereof and being positioned between said first and second arms and said fork arms,
    first and second rods pivotally secured to said first and second arms and extending upwardly therefrom respectively,
    a bracket secured to said fork means,
    said first and second rods movably extending through said bracket,
    an upper pair of springs on the upper ends of said first and second rods respectively and being positioned above said bracket,
    a lower pair of springs on said first and second rods respectively and being positioned below said bracket,
    means for normally maintaining said upper and lower pairs of springs in substantially equal compression
    said means for maintaining said springs in substantially equal compression comprises clamp means vertically adjustably mounted on said first and second rods below said lower pair of springs, and said bracket comprises a horizontal base portion secured to said fork means at the upper end of said fork arms and extending forwardly therefrom, a substantially vertical intermediate portion extending upwardly from the forward end of said base portion, and a horizontal top portion extending forwardly from the upper end of said intermediate portion, said top portion having a pair of openings formed therein which receive said rods.

2. The system of claim 1 wherein said means for maintaining said springs in substantially equal compression also comprises a nut means threadably mounted on the upper ends of said rods.

3. The system of claim 1 wherein said arms are substantially straight and extend forwardly and upwardly from said fork arms.

* * * * *